United States Patent
Zhao et al.

(10) Patent No.: US 11,941,424 B2
(45) Date of Patent: Mar. 26, 2024

(54) APPARATUS FOR VIRTUALIZED REGISTERS AND METHOD AND COMPUTER PROGRAM PRODUCT FOR ACCESSING TO THE SAME

(71) Applicant: Shanghai Biren Technology Co., Ltd, Shanghai (CN)

(72) Inventors: Song Zhao, Shanghai (CN); XiangLiang Yu, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 448 days.

(21) Appl. No.: 17/366,367

(22) Filed: Jul. 2, 2021

(65) Prior Publication Data

US 2022/0206835 A1 Jun. 30, 2022

(30) Foreign Application Priority Data

Dec. 30, 2020 (CN) .......................... 202011611273.1

(51) Int. Cl.
G06F 9/44 (2018.01)
G06F 9/30 (2018.01)
G06F 9/455 (2018.01)

(52) U.S. Cl.
CPC ...... G06F 9/45558 (2013.01); G06F 9/30123 (2013.01); G06F 2009/45583 (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 7,685,401 B2 | 3/2010 | Sugumar et al. | |
| 8,726,274 B2* | 5/2014 | Pafumi | G06F 9/45558 |
| | | | 718/1 |
| 10,671,460 B2 | 6/2020 | Mittal et al. | |
| 10,754,789 B1* | 8/2020 | Volpe | G06F 12/08 |
| 2010/0153617 A1* | 6/2010 | Miroshnichenko | G06F 3/061 |
| | | | 718/1 |
| 2019/0243552 A1 | 8/2019 | Maharana et al. | |

FOREIGN PATENT DOCUMENTS

| | | |
|---|---|---|
| CN | 101236529 B | 2/2013 |
| CN | 110633055 A | 12/2019 |
| TW | 201937373 A | 9/2019 |
| TW | I710912 B | 11/2020 |

* cited by examiner

*Primary Examiner* — Timothy A Mudrick
(74) *Attorney, Agent, or Firm* — Birch, Stewart, Kolasch & Birch, LLP

(57) ABSTRACT

The invention relates to an apparatus for virtualized registers. The apparatus includes register space, group selectors, and a block selector. The register space is divided into physical blocks, each of which includes register groups, and each register group contains registers. Each group selector is coupled to a portion of the register groups in a corresponding physical block, and is arranged operably to enable one of the portion of the register groups in the corresponding physical block in accordance with a first control signal corresponding to a virtual device, or a function performed by the virtual device. The block selector, coupled to the group selectors, is arranged operably to enable one of the group selectors in accordance with a second control signal corresponding to a virtual machine instruction. The virtual machine instruction is translated into an operation of the virtual device.

20 Claims, 6 Drawing Sheets

APPARATUS FOR VIRTUALIZED REGISTERS AND METHOD AND COMPUTER PROGRAM PRODUCT FOR ACCESSING TO THE SAME

CROSS-REFERENCE TO RELATED APPLICATIONS

This application claims the benefit of priority to Patent Application No. 202011611273.1, filed in China on Dec. 30, 2020; the entirety of which is incorporated herein by reference for all purposes.

BACKGROUND

The disclosure generally relates to registers and, more particularly, to apparatuses for virtualized registers, and methods and computer program product for accessing to the apparatuses.

In a virtual machine (VM) environment, it is important to virtualize registers, and each VM user accesses to the registers owned by virtual devices, so that the entire virtual devices seem to be occupied by a VM. For devices that support virtualization, it is required to ensure the isolation and efficiency for accessing to registers, and also reduce the difficulty of hardware design and the occupation of resources.

In some typical implementations, the hardware may allocate a set of independent register space for each VM user. However, the hardware resources of physical registers are very large, and also occupy very large hardware interface. With the number of supported virtual devices increase, the required physical hardware resources may be too large to realize.

In alternative implementations, the hardware may include an arbiter to allow all VM users to access to the whole registers in a time-sharing manner to achieve the purpose of register virtualization. However, each time before one VM user accesses to the registers, the arbiter needs to preserve the register content created by another VM user first, and re-write the preserved content into the registers before the another VM user switches back. In other words, for each VM user switch, the arbiter needs to perform a procedure for saving and restoring the register content, which consumes more time and resources. When the number of virtual devices is relatively large, the saving and recovery time would be long, which greatly reduces the efficiency of device virtualization.

In order to solve or reduce the aforementioned technical problems, the present invention proposes an apparatus for virtualized registers, and a method and a computer program product for accessing to the apparatus.

SUMMARY

The disclosure relates to an embodiment of an apparatus for virtualized registers, including register space, group selectors, and a block selector. The register space is divided into physical blocks, each of which includes register groups, and each register group contains registers. Each group selector, coupled to a portion of the register groups in a corresponding physical block, is arranged operably to enable one of the portion of the register groups in the corresponding physical block in accordance with a first control signal corresponding to a virtual device, or a function performed by the virtual device. The block selector, coupled to the group selectors, is arranged operably to enable one of the group selectors in accordance with a second control signal corresponding to a virtual machine instruction. The virtual machine instruction is translated into an operation of the virtual device.

The disclosure further relates to an embodiment of a method for accessing to a virtualized register device, performed by a processing unit when loading and executing program code of a virtual device. The virtualized register device includes register groups, a block selector, group selectors, and a read/write circuit. Each group selector is coupled to register groups in a physical block. The method includes steps for: controlling the block selector to enable one of the group selectors; controlling the enabled group selector to enable one of the register groups in accordance with information of the virtual device, or a function performed by the virtual device, which is going to issue a request to access to a register; and issuing the request to the read/write circuit to access to the enabled register group for reading data from the register, or writing data into the register.

The disclosure further relates to an embodiment of a non-transitory computer program product for accessing to a virtualized register device when executed by a processing unit. The virtualized register device includes register groups, a block selector, group selectors, and a read/write circuit. Each group selector is coupled to register groups in a physical block. The non-transitory computer program product includes program code to: control the block selector to enable one of the group selectors; control the enabled group selector to enable one of the register groups in accordance with information of the virtual device, or a function performed by the virtual device, which is going to issue a request to access to a register; and issue the request to the read/write circuit to access to the enabled register group for reading data from the register, or writing data into the register.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
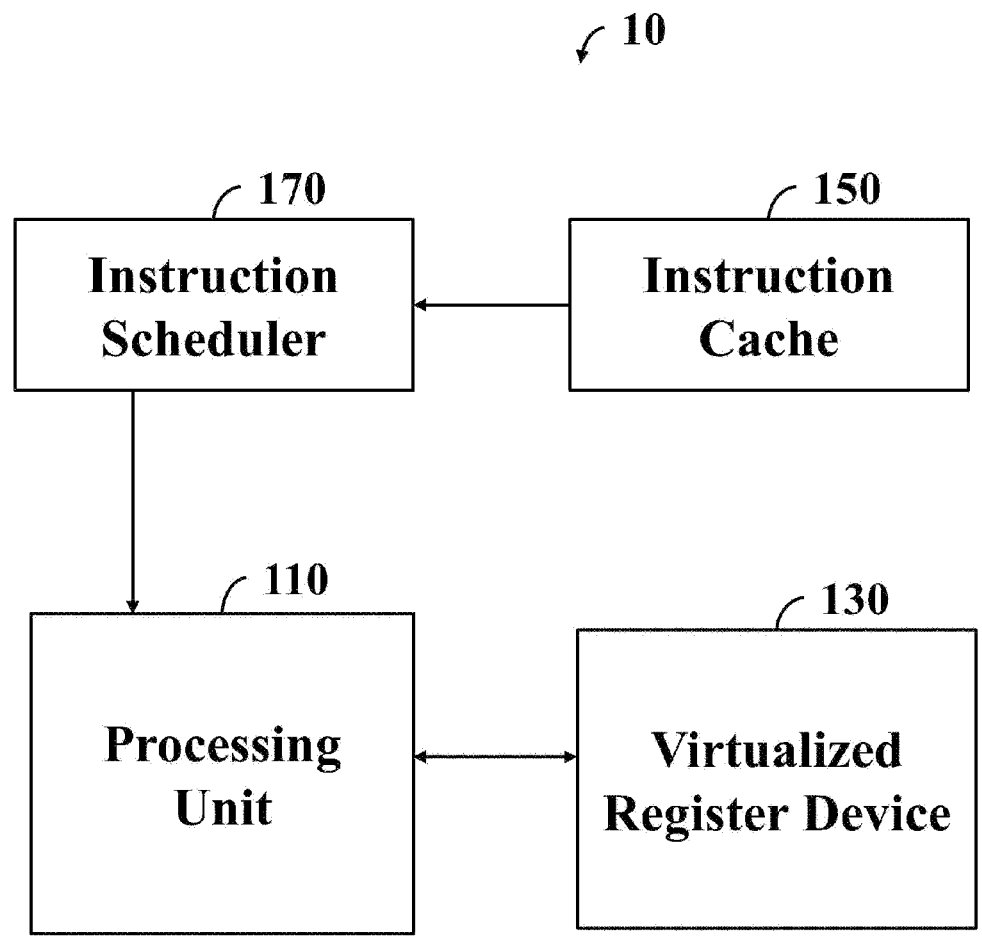
FIG. 1 is a block diagram of an electronic apparatus according to an embodiment of the invention.

Refer to FIG. 1. The electronic apparatus 10 may be realized in a mainframe, a workstation, a Personal Computer (PC), a laptop PC, a tablet PC, a mobile phone, a digital camera, a digital recorder, or other consumer electronic products. The electronic apparatus 10 includes at least the processing unit 110, the virtualized register device 130, the instruction cache 150 and the instruction scheduler 170, which are connected to each other through physical wires to transmit data, addresses, control signals, etc. The instruction cache 150 is used to store multiple instructions for virtual machines (VMs) or virtual devices, and the instruction scheduler 170 is used to obtain instructions to be executed from the instruction cache 150 for each VM or virtual device in accordance with the program counter (PC). The instruction scheduler 170 may include a PC register to record the position (i.e. the address) of the instruction currently being executed. The program counter is normally incremented by one every time an instruction is fetched from the instruction cache 150. The instruction scheduler 170 sends instructions to the processing unit 110 for execution at proper time points. The processing unit 110 may load and execute computer instruction codes corresponding to different VMs or virtual devices. The VM is a computer system that is simulated by software, has complete hardware functions, and runs in an environment isolated from the other VMs. Different VMs may run different operating systems, such as Linux, Redhat, etc., and different VMs may be physically isolated from each other. That is, such data, data tables, variables, and execution results in one VM cannot be accessed by any other VM. One VM may provide functionalities of different virtual devices, such as data calculation, address translation, video processing, audio processing, wired and wireless data transmission, etc. The processing unit 110 may include an arithmetic logic unit (ALU) to perform various operations for VMs and virtual devices, such as addition and multiplication of integers and floating-point numbers, comparisons, Boolean operations, bit shifts, algebraic functions (e.g. plane interpolation, trigonometric functions, exponential functions, logarithmic functions), etc.

Moreover, the processing unit 110 may read data from the virtualized register device 130 and write back the execution results to the virtualized register device 130 in execution.

Figure 2:
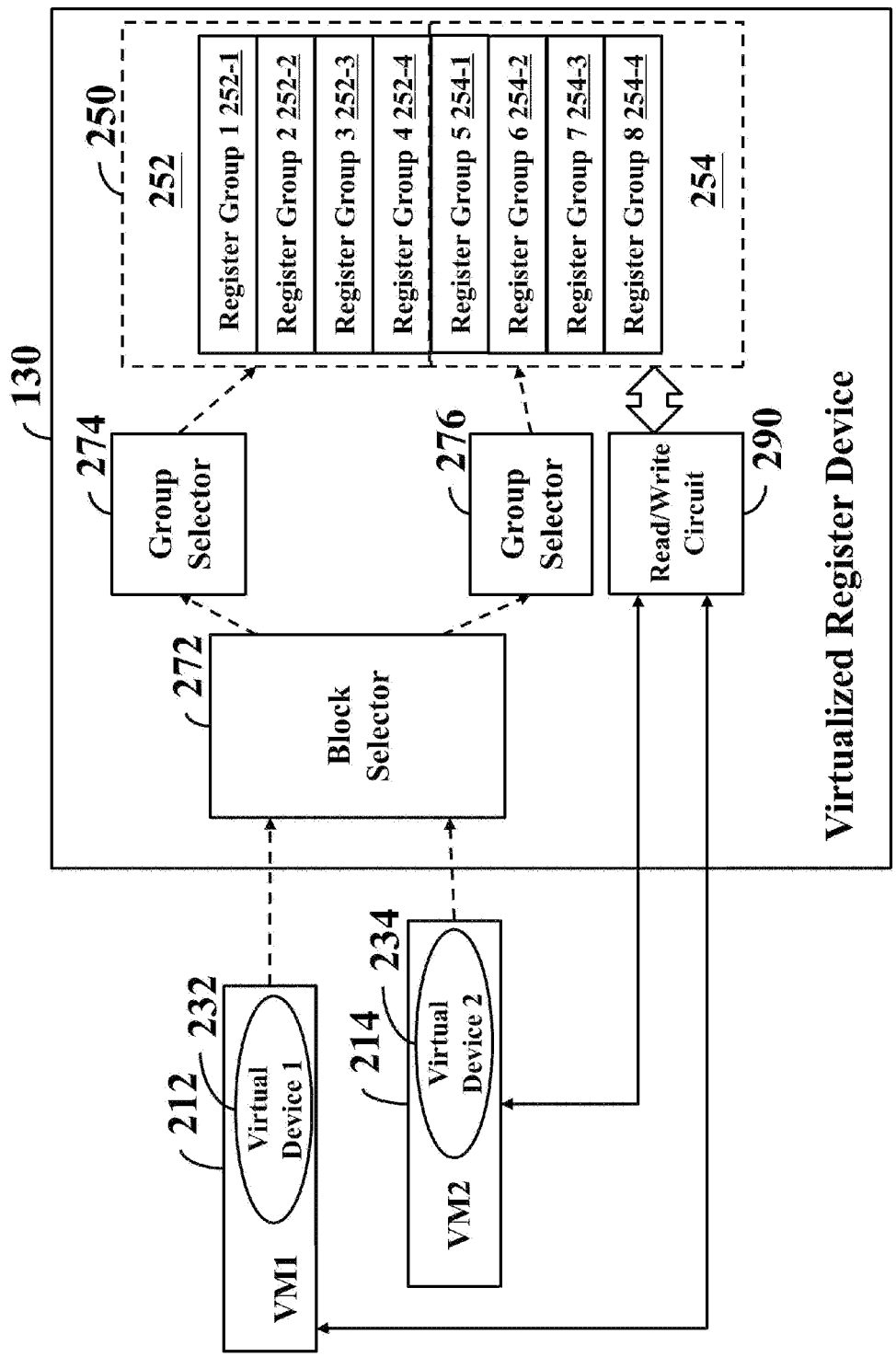
FIG. 2 is a block diagram of an operated virtual device and a virtualized register device according to an embodiment of the invention.

Refer to FIG. 2. For example, relevant computer instructions corresponding two VMs 212 and 214 may be run on the processing unit 110, and the VMs 212 and 214 may provide functionalities of the virtual devices 232 and 234, respectively. The virtual devices 232 and 234 need to write data into the virtualized register device 130, and read data from the virtualized register device 130 in execution. The virtualized register device 130 includes register space 250 for storing data for different virtual devices, which is required during execution. The register space 250 may be divided into non-overlapping physical blocks 252 and 254, and each physical block is allocated to a specific VM for use. For example, the physical block 252 is allocated to the VM 212, and the physical block 254 is allocated to the VM 214. In other words, only the virtual device 232, or other virtual devices run in the VM 212 can access to the registers in the physical block 252, but the virtual device 234, or other virtual devices run in the VM 214 cannot access to the registers in the physical block 252. Each physical block may include multiple register groups, for example, the physical block 252 includes four register groups 252-1 to 252-4, and the physical block 254 includes four register groups 254-1 to 254-4. The utilization scope of the register groups may be defined by users. It may be defined according to the usage types (for example, used for data transmission, device attribute waiting, etc.), or according to the function types (for example, video processing, address translation, data calculation, etc.). For the virtual devices that implement the same function, the registers in each group are the same for use, which ensure that the implemented virtual devices are consistent. It is also feasible to divide the registers according to their embedded functions, so that a register group is used to realize functions of a virtual device.

These register groups may be assigned to different virtual devices, or different functions performed in different virtual devices. For example, three virtual devices are executed on the VM 212: virtual Wi-Fi communications device; virtual displayer; and virtual video decoder. The virtual video decoder provides functions of video and audio decoding. The register group 252-1 may be assigned to the virtual Wi-Fi communications device executed on the VM 212, and the register group 252-2 may be assigned to the virtual displayer executed on the VM 212. Additionally, the register groups 252-3 and 252-4 may be assigned to the video and audio decoding functions performed by the virtual video decoder executed on the VM 212, respectively. Although FIG. 2 describes the example showing that two physical blocks are divided in the register space 250, those artisans may realize more physical blocks in the register space 250 to support a greater number of VMs depending on different system requirements, and the invention should not be limited thereto. Although FIG. 2 describes the example of the physical blocks 252 and 254 of the same size, those artisans may realize the physical blocks of different sizes for satisfying different needs of VMs, and the invention should not be limited thereto.

Figure 3:
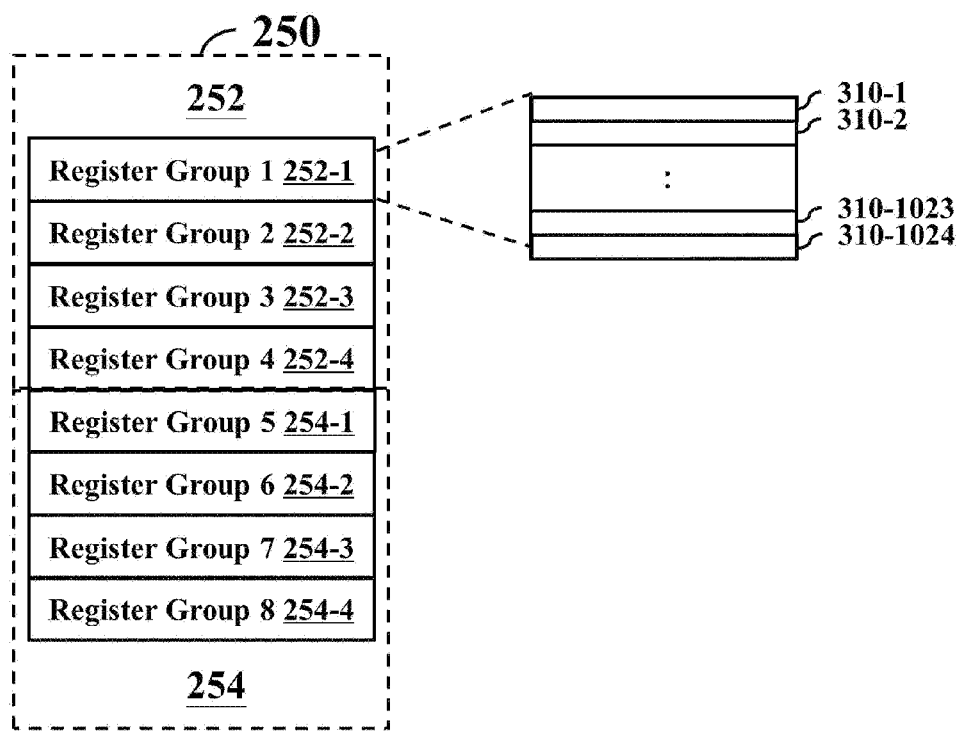
FIG. 3 shows exemplary divisions for register groups according to an embodiment of the invention.

Each register group may include multiple registers. In some embodiments, the total numbers of registers in different register groups are the same to ensure that each virtual device, or each function in a virtual device has equal resource. Refer to FIG. 3. Each register group contains 1024 registers. For example, the register group 252-1 contains registers 300-1 to 300-1024, and each register may store data of 32 bits (i.e. 4 bytes) to allow the register group 252-1 to store data of 4 KB. Although FIG. 3 describes the example of each register group containing 1024 registers, those artisans may dispose more or less registers on each register group depending on different system requirements, and the invention should not be limited thereto. For example, each register group may contain 2048, 512 or 256 registers to allow each register group to store data of 8 KB, 2 KB or 1 KB.

In alternative embodiments, the total numbers of registers in different register group are different according to user requirements, which ensures on-demand allocation and reflects flexibility. For example, the register groups 252-1, 252-2, 252-3, and 252-4 may contain 1024, 512, 2048, and 512 registers, respectively.

Refer back to FIG. 2. The virtualized register device 130 includes the block selector 272 and two group selectors 274 and 276 to configure the access path in accordance with the control signals sent from the processing unit 110, which are associated with a specific virtual device, or a specific function performed in a specific virtual device. The block selector 272 is coupled to the group selectors 274 and 276, the group selector 274 is coupled to the register groups 252-1 to 252-4, and the group selector 276 is coupled to the register groups 254-1 to 254-4. The block selector 272 enables the group selector 274 or 276 in accordance with a control signal sent from the processing unit 110, which is associated with a VM instruction. Those artisans knows that the VM instruction could be translated into an operation of a specific virtual device. The group selector 274 enables one of the register groups 252-1 to 252-4 in accordance with a control signal sent from the processing unit 110, and the group selector 276 enables one of the register groups 254-1 to 254-4 in accordance with a control signal sent from the processing unit 110. The control signal is associated with a specific virtual device, or a specific function performed in a specific virtual device. The virtualized register device 130 further includes the read/write circuit 290 to read data from the register indicated through the access path, or write data into the register indicated through the access path. Specifically, when the virtualized register device 130 receives a register request sent from the virtual device 232 or 234, the read/write circuit 290 accesses to the register on the access path configured by the block selector 272, the group selectors 274 and 276.

The logics for dividing the register space 250, and assigning the register groups of each physical block, as described above may be embedded in computer program codes of the virtual devices 232 and 234. The block selector 272, and the group selectors 274 and 276 of the virtualized register device 130 are controlled to configure the access path dynamically when the processing unit 110 loads and executes the logics.

Figure 4:
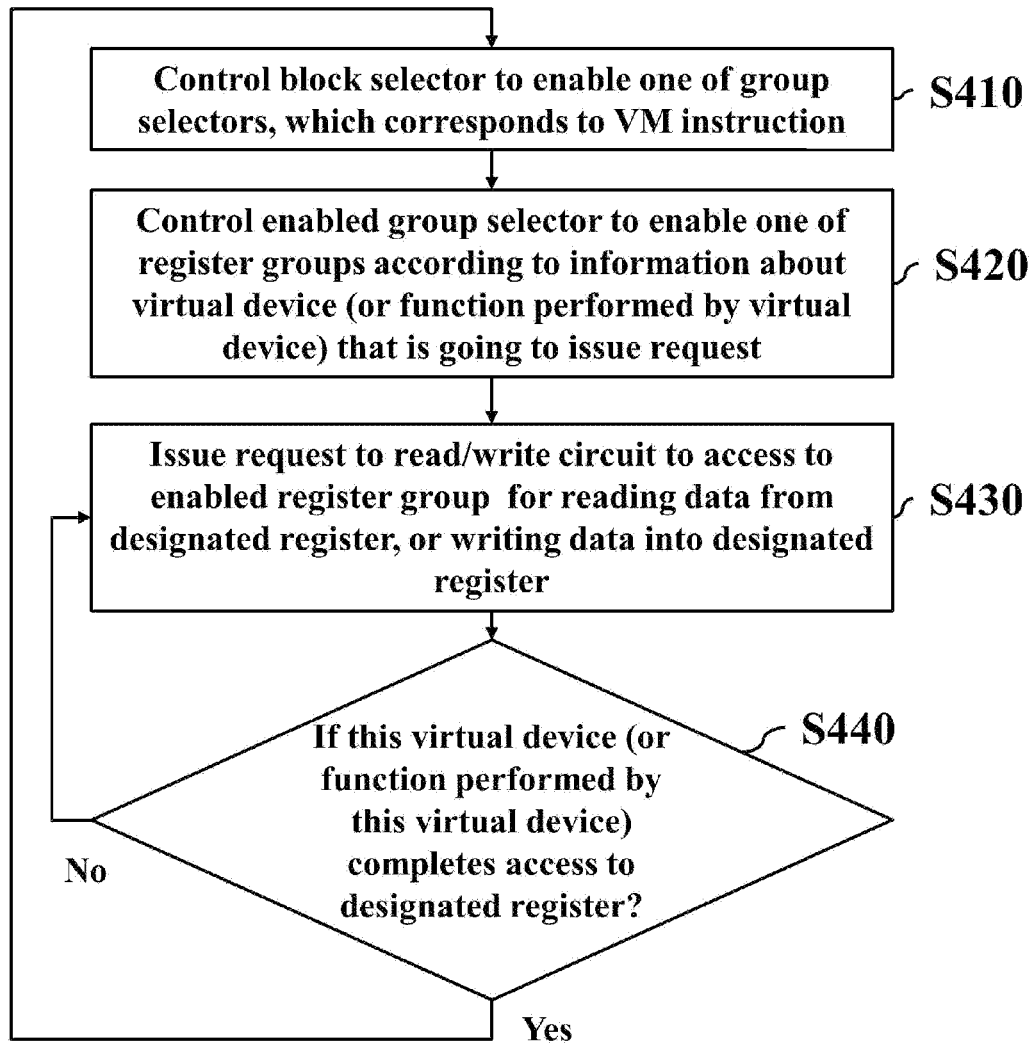
FIG. 4 is a flowchart of a method for accessing to a virtualized register device according to an embodiment of the invention.

Refer to FIG. 4 illustrating the method for accessing to the virtualized register device 130, which is performed by the processing unit 110 when loading and executing computer program codes of the virtual device 232 or 234. The method includes the following steps:

Step S410: A block selector is controlled to enable one of multiple group selectors, which corresponds to a VM instruction. Those artisans know that the VM instruction could be translated into an operation of a specific virtual device. For example, the block selector 272 is controlled to enable the group selector 274 when the virtual device 212 is going to issue a request to access to a register.

Step S420: The enabled group selector is controlled to enable one of multiple register groups in accordance with the information about the virtual device (or the function performed by the virtual device) that is going to issue the request. For example, the group selector 274 is controlled to enable the register group 252-1 when the virtual device 232 (hereinafter assumed to be a virtual Wi-Fi communications device) executed on the VM 212 is going to issue the request.

Step S430: The request is issued to the read/write circuit 290 to access to the enabled register group for reading data from the designated register, or writing data into the designated register. The request may include information about the type (e.g. read, write, delete, etc.), the offset, the data to be written. For example, the virtual Wi-Fi communications device 232 executed on the VM 212 issues a request to the read/write circuit 290 to attempt to read data from the address being the offset "100". The read/write circuit 290 reads data from the register 310-100, and replies with the read data to the virtual Wi-Fi communications device 232.

Step S440: It is determined whether this virtual device (or the function performed by this virtual device) completes the access to the designated register. If so, the process proceeds to step S410. Otherwise, the process proceeds to step S430.

The aforementioned method includes the accelerated access mechanism that the virtualized register device 130 ensures that the access path to the register remains unchanged after one register group is enabled until the next change for the register groups. In this way, there is no need for the virtualized register device 130 to change the access path when one virtual device (or a specific function performed by one virtual device) accesses to the same register group within a time period. That is, the block selector 272, and the group selectors 274 and 276 are not controlled to change the access path until one virtual device (or a specific function performed by one virtual device) completes the predetermined accesses to the enabled register group, so that the time spent in the whole access is reduced and the access efficiency is improved.

Figure 5:
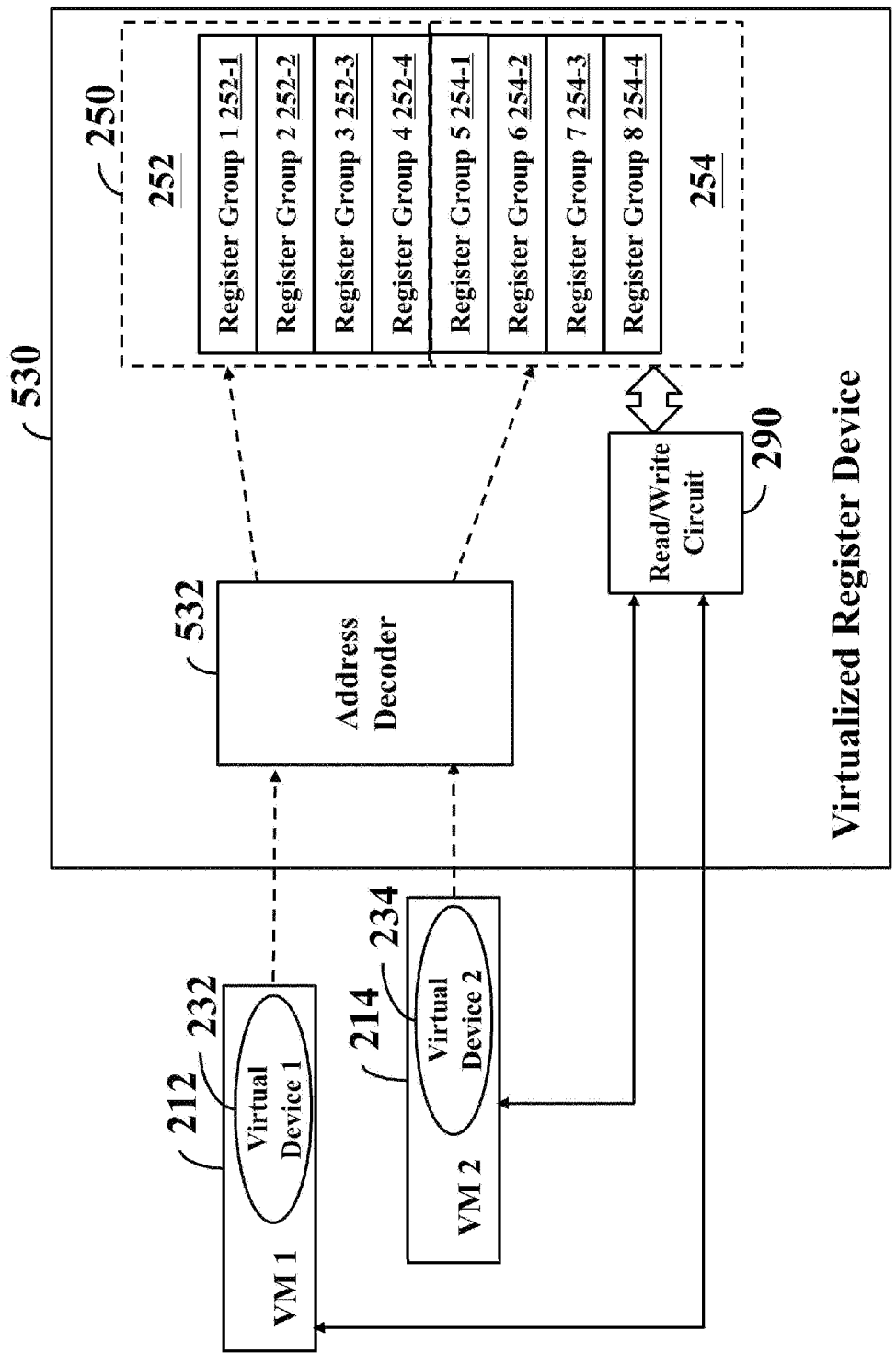
FIG. 5 is a block diagram of an operated virtual device and a virtualized register device according to an embodiment of the invention.

The functions performed by the block selector 272, the group selectors 274 and 276, as shown in FIG. 2, may be implemented by software instead. Refer to FIG. 5 showing alternative embodiments of the virtualized register device 530. The virtualized register device 530 includes the address decoder 532 to enable one of the register groups 252-1 to 254-4 in accordance with an address sent from the virtual device 232 or 234.

Figure 6:
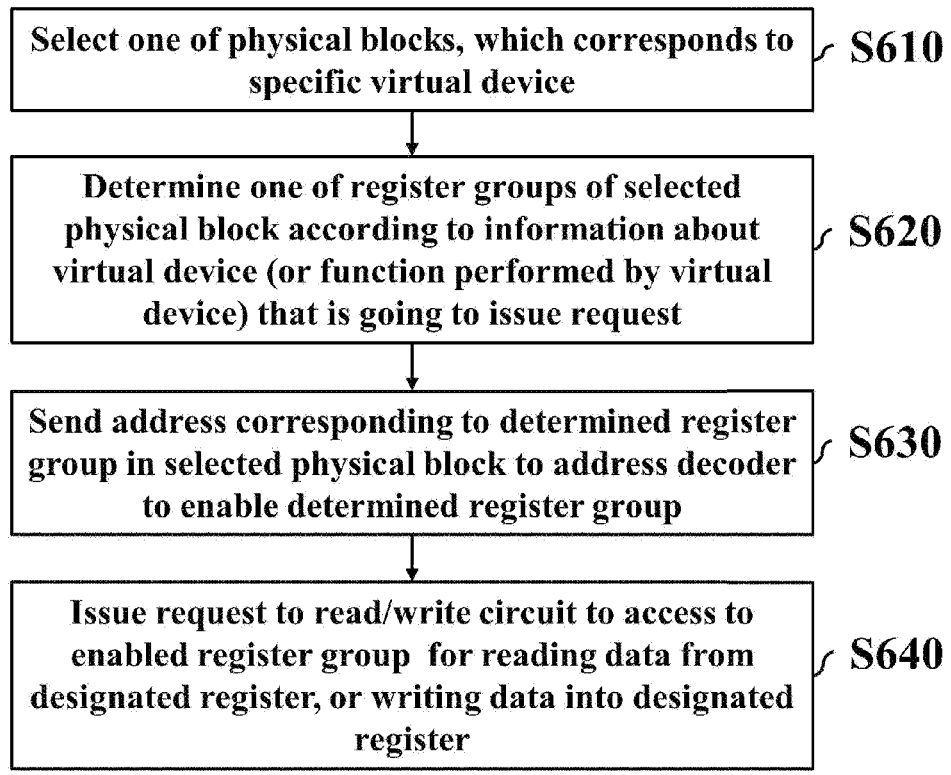
FIG. 6 is a flowchart of a method for accessing to a virtualized register device according to an embodiment of the invention.

To conform to the installation of the virtualized register device 530 as shown in FIG. 5, FIG. 6 illustrates the method for accessing to the virtualized register device 530, which is performed by the processing unit 110 when loading and executing computer program codes of the virtual device 232 or 234. The method includes the following steps:

Step S610: One of multiple physical blocks, which corresponds to a specific virtual device, is selected. For example, the physical block 252 is selected when the virtual device 232 is going to issue a request to access to a register.

Step S620: One of multiple register groups in the determined physical block is selected in accordance with the information about the virtual device (or the function performed by the virtual device) that is going to issue the request. For example, the register group 252-1 of the physical block 252 is selected when the virtual device 232 (hereinafter assumed to be a virtual Wi-Fi communications device) executed on the VM 212 is going to issue the request.

Step S630: The address corresponding to the determined register group in the selected physical block is sent to the address decoder 532 to enable the selected register group.

Step S640: The request is issued to the read/write circuit 290 to access to the enabled register group for reading data from the designated register, or writing data into the designated register. Since the technical details of this step are similar to that recited in step S430, those artisans may refer to the relevant descriptions of step S430, which will not be repeated here for the brevity.

Through the aforementioned dynamical change of access path by the block and group selection with the register group divisions, there would be no need to preserve and restore the data previously stored in the registers, leading to the improved efficiency for register access.

Additionally, there would be no need to preserve more than the actual number of registers in order to support more VMs, so that the hardware cost would be saved.

Some or all of the aforementioned embodiments of the method of the invention may be implemented in a computer program, such as an application, a driver, an OS code, etc., in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1, 2, and 5, it should be noted that additional elements may be included to achieve better performance without departing from the spirit of the invention. Each element of FIGS. 1, 2, and 5 is composed of various circuits and arranged to operably perform the aforementioned operations. While the process flows described in FIGS. 4, and 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for virtualized registers, comprising:
    register space, divided into a plurality of physical blocks, wherein each physical block comprises a plurality of register groups, and each register group comprises a plurality of registers;
    a plurality of group selectors, wherein each group selector is coupled to a portion of the register groups in a corresponding physical block, and is arranged operably to enable one of the portion of the register groups in the corresponding physical block in accordance with a first control signal corresponding to a virtual device, or a function performed by the virtual device; and
    a block selector, coupled to the group selectors, arranged operably to enable one of the group selectors in accordance with a second control signal corresponding to a virtual machine instruction,
    wherein the virtual machine instruction is translated into an operation of the virtual device.

2. The apparatus of claim 1, wherein the physical blocks are not overlapped.

3. The apparatus of claim 1, wherein the first control signal and the second control signal are issued by a processing unit.

4. The apparatus of claim 1, comprising:
    a read/write circuit, arranged operably to access to an enabled register group for reading data from a designated register, or writing data into a designated register.

5. The apparatus of claim 4, wherein a total number of registers comprised in each of the register groups is the same.

6. The apparatus of claim 4, wherein a total number of registers comprised in each of the register groups is different.

7. A method for accessing to a virtualized register device, performed by a processing unit when loading and executing program code of a virtual device, wherein the virtualized register device comprises a plurality of register groups, a block selector, a plurality of group selectors, and a read/write circuit, and each group selector is coupled to a plurality of register groups in a physical block, the method comprising:
    controlling the block selector to enable one of the group selectors;
    controlling the enabled group selector to enable one of the register groups in accordance with information of the virtual device, or a function performed by the virtual device, which is going to issue a request to access to a register; and
    issuing the request to the read/write circuit to access to the enabled register group for reading data from the register, or writing data into the register.

8. The method of claim 7, comprising:
    not controlling the block selector and the group selectors to change access path until the virtual device, or the function performed by the virtual device completes predetermined access to the enabled register group.

9. The method of claim 8, wherein the virtualized register device comprises register space divided into a plurality of physical blocks, each physical block comprises a plurality of register groups, and the physical blocks are not overlapped.

10. The method of claim 9, wherein a total number of registers comprised in each of the register groups is the same.

11. The method of claim 9, wherein a total number of registers comprised in each of the register groups is different.

12. The method of claim 7, comprising:
    issuing a first control signal corresponding to a virtual machine instruction to control the block selector to enable one of the group selectors,
    wherein the virtual machine instruction is translated into an operation of the virtual device.

13. The method of claim 12, comprising:
    issuing a second control signal corresponding to the virtual device, or the function performed by the virtual device, which is going to issue the request to access to the register, so as to control the enabled group selector to enable one of the register groups.

14. A non-transitory computer program product for accessing to a virtualized register device when executed by a processing unit, wherein the virtualized register device comprises a plurality of register groups, a block selector, a plurality of group selectors, and a read/write circuit, and each group selector is coupled to a plurality of register groups in a physical block, the non-transitory computer program product comprising program code to:
- control the block selector to enable one of the group selectors;
- control the enabled group selector to enable one of the register groups in accordance with information of the virtual device, or a function performed by the virtual device, which is going to issue a request to access to a register; and
- issue the request to the read/write circuit to access to the enabled register group for reading data from the register, or writing data into the register.

15. The non-transitory computer program product of claim 14, comprising program code to:
- not control the block selector and the group selectors to change access path until the virtual device, or the function performed by the virtual device completes predetermined access to the enabled register group.

16. The non-transitory computer program product of claim 14, wherein the virtualized register device comprises register space divided into a plurality of physical blocks, each physical block comprises a plurality of register groups, and the physical blocks are not overlapped.

17. The non-transitory computer program product of claim 16, wherein a total number of registers comprised in each of the register groups is the same.

18. The non-transitory computer program product of claim 16, wherein a total number of registers comprised in each of the register groups is different.

19. The non-transitory computer program product of claim 14, comprising program code to:
- issue a first control signal corresponding to a virtual machine instruction to control the block selector to enable one of the group selectors,
- wherein the virtual machine instruction is translated into an operation of the virtual device.

20. The non-transitory computer program product of claim 19, comprising program code to:
- issue a second control signal corresponding to the virtual device, or the function performed by the virtual device, which is going to issue the request to access to the register, so as to control the enabled group selector to enable one of the register groups.

* * * * *